United States Patent [19]

Kiuchi et al.

[11] Patent Number: 4,701,368
[45] Date of Patent: Oct. 20, 1987

[54] PAPERMAKER'S PRESSURE BELT FOR EXTENDED NIP PRESSES

[75] Inventors: Masao Kiuchi, Kamagaya; Yoshiaki Ito, Matsudo; Nobuyuki Ishibashi; Kazuo Yamada, both of Tokyo, all of Japan

[73] Assignee: Ichikawa Wollen Textile Co., Ltd., Japan

[21] Appl. No.: 851,510

[22] Filed: Apr. 14, 1986

[30] Foreign Application Priority Data

Apr. 25, 1985 [JP] Japan ................... 60-89732

[51] Int. Cl.⁴ .............................. B32B 5/02
[52] U.S. Cl. ................... 428/233; 428/234; 428/235; 428/246; 428/284; 428/308.4; 428/309.9
[58] Field of Search .............. 428/246, 247, 252, 284, 428/286, 234, 235, 300, 233

[56] References Cited

U.S. PATENT DOCUMENTS 3,059,312 10/1962 Jamieson ........................... 428/234
4,267,227  5/1981 Schiher et al. .................... 428/300
4,271,222  6/1981 Hahn ................................. 428/280
4,552,620 11/1985 Adams ............................... 162/358

Primary Examiner—James J. Bell
Attorney, Agent, or Firm—Lane and Aitken

[57] ABSTRACT

A papermaker's pressure belt for extended nip presses, which comprises a belt base formed of a strong woven fabric having high dimensional stability, a squeezing layer to be in contact with a wet fibrous web on an extended nip press, having a large void volume and formed of a compressible elastic and porous or cellular material, such as fibrous batt, sponge or a foam resin, and formed on one side of the belt base, and an impermeable layer impermeable to oil, formed on the other side of the belt base. The squeezing layer facilitates the separation of the fibrous web from the pressure belt, while the impermeable layer inhibits the permeation of the lubricant applied to the acting surface of the pressure shoe of the extended nip press through the pressure belt.

8 Claims, 12 Drawing Figures

PAPERMAKER'S PRESSURE BELT FOR EXTENDED NIP PRESSES

BACKGROUND OF THE INVENTION (i) Field of the Invention:

The present invention relates to an improved papermaker's pressure belt for extended nip presses for dewatering a fibrous web of paper.

(ii) Description of the Prior Art:

Conventional extended nip presses of two different types are illustrated in FIGS. 8A and 8B. The extended nip press of FIG. 8A comprises a press roll 1, a pressure shoe 2 having a concave arcuate surface facing the press roll and having about the same radius of curvature as the press roll 1, and an endless pressure belt 3. A wet fibrous web 5 is traveled between the pressure belt 3 and a felt 4 trained around the press roll 1, and the wet fibrous web 5 is squeezed by the pressure belt 3 forced towards the press roll 1 by the pressure shoe 2. The extended nip press of FIG. 8B is provided with an additional felt 4' trained along the pressure belt 3. In this extended nip press, a wet fibrous web 5 is sandwitched between the two felts 4 and 4' for squeezing.

In the former extended nip press of FIG. 8A, one side of the pressure belt 3 is in direct contact with the wet fibrous web 5 and the other side is in direct contact with the pressure shoe 2, respectively. Accordingly, the surface of the pressure belt 3 which is in contact with the wet fibrous web 5 should be smooth, since the surface condition directly affects the finish of the surface of the fibrous web, while the other surface of the pressure belt 3 which is in contact with the pressure shoe 2 needs to be processed so that the lubricant supplied to the acting surface of the pressure shoe 2 is prevented from permeating the pressure belt 3. In order to provide a pressure belt with such properties, a conventional pressure belt comprises a belt base 3a composed of a woven fabric or the like, and coating layers 3b and 3b' of highly abrasion-resistant synthetic resin such as polyurethane resin formed on the both faces of the belt base 3a, respectively, as illustrated in FIG. 9. However, in a high-speed papermaking process as represented in FIG. 8A, a wet fibrous web 5 tends to stick to such a smooth coated layer, and hence a separation of the wet fibrous web 5 from such a pressure belt does not readily take place.

On the other hand, in the extended nip press of FIG. 8B, since the pressure belt 3 is forced indirectly towards a wet fibrous web 5 through the felt 4', the surface of the pressure belt 3 which faces the wet fibrous web 5 need not be smooth. Therefore, a coating layer 3b' needs to be formed only on one surface of a belt base 3a to be in contact with the pressure shoe as illustrated in FIG. 10. It is also possible to have a belt base coated with coating layers on both faces thereof and provided with draining grooves in the coating layer which faces the wet fibrous web for draining water squeezed from the wet fibrous web by the felt 4'. Such a pressure belt having grooved squeezing surface, when used in combination with a grooved press roll, improves the squeezing performance of the extended nip press. Furthermore, since the wet fibrous web is sandwitched between the upper and lower felt belts, it can be released easily from those upper and lower felt belts even in a high-speed papermaking operation. However, since the extended nip press of FIG. 8B is provided with two felt belts, it has the disadvantage that the papermaking machine employing this extended nip press is inevitably large in constructions and is expensive.

SUMMARY OF THE INVENTION

Accordingly, it is an object of the present invention to provide a papermaker's pressure belt without the problems of the conventional pressure belts and permitting a simplification of the constructions of the papermaking machine and reducing papermaking costs.

The objects of the present invention are achieved by a papermaker's pressure belt for extended nip presses, comprising: a belt base; a squeezing layer having a large void volume formed of a compressible elastic and porous or cellular material, such as fibrous batt, sponge or a foam resin, and formed on one side of the belt base; and an impermeable layer impermeable to oil, formed on the other side of the belt base.

The papermaker's pressure belt according to the present invention has a water absorbing and paper sheet releasing functions comparable to the felt belt.

The above and other objects, features and advantages of the present invention will become more apparent from the following description of preferred embodiments thereof taken in conjunction with the accompanying drawings.

DESCRIPTION OF THE PREFERRED EMBODIMENTS

Figure 1:
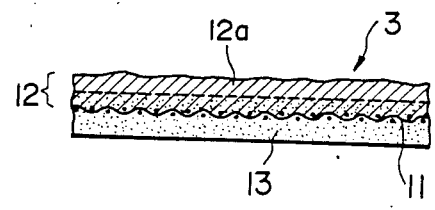
FIG. 1 is an enlarged sectional view of a papermaker's pressure belt of a first embodiment according to the present invention.
Figure 2A:
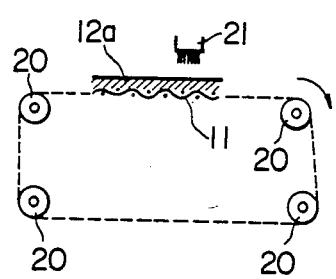
FIGS. 2A and 2B are schematic illustrations of assistance in explaining the process of manufacturing the papermaker's pressure belt of FIG. 1.

As shown in FIG. 1, a pressure belt 3 comprises an endless belt base 11 formed by joining the longitudinal opposite ends of a coarse foundation fabric together, or woven endless from the beginning, a squeezing layer 12 formed on one side of the endless belt base 11 by spreading fibrous batt over the same, and an impermeable layer 13 impermeable to oil, formed on the other side of the endless belt base 11 by applying a synthetic resin over the same. In manufacturing the pressure belt 3, the endless belt base 11 is extended between guide rollers 20, then fibrous batt 12a is supplied over one side of the belt base 11 and is bonded to the belt base 11 by needling with a needling member 21 as illustrated in FIG. 2A.

The fibrous batt is made primarily of synthetic fibers, 50 to 125 mm in length and 3 to 40 denier in diameter, blended together and carded to produce a web by a carding machine. Thereafter the web is folded in accordion folds by a cloth lapper on the belt base and bonded thereto by needling. Needling is a term of art referring to a method of attachment wherein the fibers of one layer are entangled with the fibers of a second layer by means of barbed needles reciprocated through the layers. Examples of the synthetic fibers comprising the fibrous batt are polyamide fibers, aromatic polyamide fibers, polyester fibers, polyacrylic fibers, and polyolefin fibers. The synthetic fibers may be used in combination with a small amount of natural fibers such as wool or regenerated fibers.

Figure 2B:
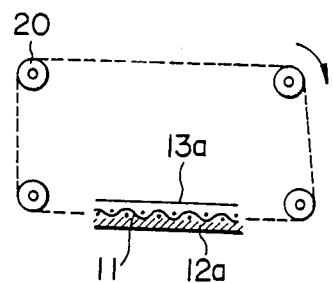

After the fibrous batt has been bonded to the belt base 11, a synthetic resin 13a is applied to the other side of the belt base 11 to form an impermeable layer 13 as illustrated in FIG. 2B. The synthetic resin 13a is applied to the belt base 11 so that the synthetic resin permeates the belt base 11 and the inner portion of the fibrous batt 12a as indicated by broken line in FIG. 1, leaving the remainder of the fibrous batt unpenetrated by the resin as the squeezing layer 12. Accordingly the fibrous batt 12a is bonded firmly to the belt base 11 and the dimensional stability of the pressure belt 3 is enhanced.

Figure 3:
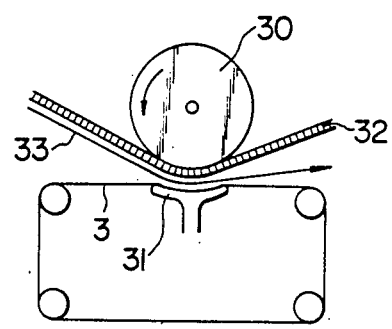
FIG. 3 is a schematic view illustrating the manner of employing the papermaker's pressure belt of FIG. 1 on an extended nip press.

In use, the endless pressure belt 3 is extended between a press roll 30 and a pressure shoe 31 with the impermeable layer 13 facing and in sliding contact with the upper surface of the pressure shoe 31. A wet fibrous web 33 is caused to travel between the endless pressure belt 3 and a felt belt 32 trained around the press roll 30 as illustrated in FIG. 3. The water squeezed from the wet fibrous web 33 is absorbed by the felt belt 32. Therefore, the squeezing layer 12 of the fibrous batt 12a needs to have only a sufficient thickness to allow the fibrous web to be separated easily from the squeezing layer 12 after squeezing. However, it is also possible to form a thick squeezing layer 12 from the fibrous batt 12a so that the squeezing layer 12 is capable of both absorbing the water squeezed from the wet fibrous web 33 and facilitating the separation of the fibrous web from the pressure belt 3.

Figure 4:
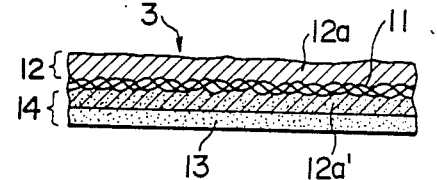
FIG. 4 is an enlarged sectional view of a papermaker's pressure belt of a second embodiment according to the present invention.
Figure 5:
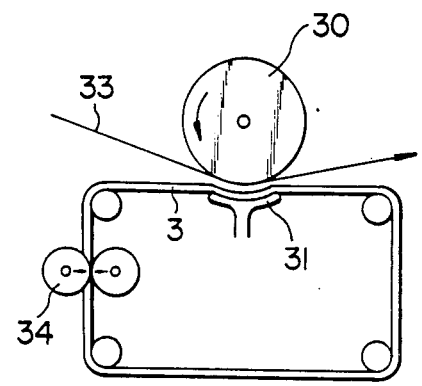
FIG. 5 is a schematic view illustrating the manner of employing the pressure belt of FIG. 4 in an extended nip press.

As shown in FIG. 4, a pressure belt 3 of a second embodiment according to the present invention comprises an endless belt base 11 formed of a firm double-layer or triple-layer woven fabric or a woven fabric consisting of synthetic monofilament yarns or synthetic multifilament yarns, a squeezing layer 12 and a backing layer 14 formed of fibrous batts 12a and 12a' attached on both sides of the belt base 11, respectively, by needling, and an impermeable layer 13 formed by applying a synthetic resin over the surface of the backing layer 14. The fibrous batts 12a and 12a' are bonded firmly to the belt base 11 by needling. In forming the impermeable layer 13 of the second embodiment, less synthetic resin, as compared with the first embodiment, is applied to the backing layer 14 so that the synthetic resin permeates only the backing layer 14 and part of the belt base 11 and does not permeate the fibrous batt 12a forming the squeezing layer 12. The thickness of the fibrous batt 12a forming the squeezing layer 12 is greater than that of the first embodiment. Therefore, the squeezing layer 12 is capable of enhanced water absorption, and thereby an extended nip press employing this pressure belt need not be provided with any dewatering felt belt, as illustrated in FIG. 5. Although the dimensional stability of the pressure belt 3 in the second embodiment is provided by the belt base 11, it is preferable in view of the strength of the pressure belt to make the synthetic resin permeate through the fibrous batt 12a' forming the backing layer 14 to the central plane of the belt base 11. The water absorbed by the squeezing layer 12 is removed by a conventional dewatering device 34.

Figure 6:
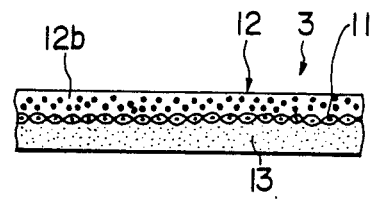
FIG. 6 is an enlarged sectional view of a papermaker's pressure belt of a third embodiment according to the present invention.

As shown in FIG. 6, which illustrates a pressure belt of a third embodiment according to the present invention, the pressure belt 3 comprises a belt base 11 having a high strength, which is the same as that of the belt base of the second embodiment, a squeezing layer 12 of sponge 12b formed on one side of the belt base 11, and an impermeable layer 13 formed by applying a synthetic resin to the other side of the belt base 11. When the sponge of the squeezing layer 12 has a property that, when compressed between a press roll 30 and a pressure shoe 31, the cells thereof collapse considerably, the squeezing layer 12 is incapable of water absorption, and hence a felt belt 32 capable of absorbing water under compression is provided as illustrated in FIG. 3, for absorbing the water squeezed from the wet fibrous web 33. In this case, the squeezing layer 12 functions only to enable the fibrous web 33 to be separated easily from the pressure belt 3 after squeezing, and therefore, the squeezing layer 12 may be formed of a closed-cell sponge which is sponge with non-communicating isolated pores. When the squeezing layer 12 is formed of a sponge capable of maintaining the cells thereof uncollapsed under compression between the press roll 30 and the pressure shoe 31, such as a sponge having properties similar to those of the felt belt, the pressure belt is applicable to an extended nip press having a configuration as shown in FIG. 5. In this case, it is desirable that the squeezing layer 12 be formed of an open-cell sponge, which is sponge that has pores communicating with each other.

Figure 7:
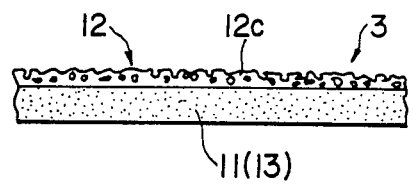
FIG. 7 is an enlarged sectional view of a papermaker's pressure belt of a fourth embodiment according to the present invention.
Figure 8A:
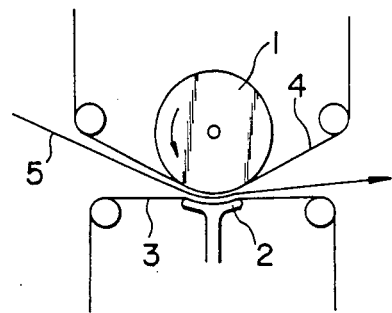
FIGS. 8A and 8B are schematic views of extended nip presses of the prior art.
Figure 8B:
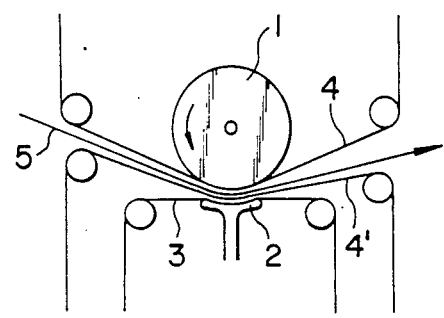
Figure 9:
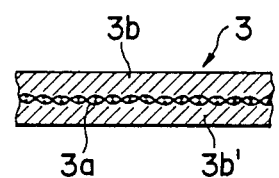
FIG. 9 is a sectional view of a papermaker's pressure belt of the prior art employed in the extended nip press of FIG. 8A.
Figure 10:
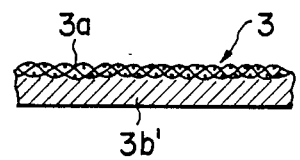
FIG. 10 is a sectional view of a papermaker's pressure belt of the prior art employed in the extended nip press of FIG. 8B.

FIG. 7 illustrates a fourth embodiment of the present invention. A pressure belt of the fourth embodiment according to the present invention comprises an impermeable belt base 11 formed of a synthetic resin and serving also as an impermeable layer 13, and a squeezing layer 12 formed of a foam resin 12c over the upper surface of the belt base 11.

As described above, a papermaker's pressure belt for extended nip presses, according to the present invention, comprises a belt base, a squeezing layer having a large void volume, formed of a compressible elastic and porous or cellular material, such as fibrous batt, sponge, or a foam resin and formed on one side of the belt base, and an impermeable layer impermeable to oil, formed on the other side of the belt base. This structure of the present invention makes unnecessary the felt belt which is employed in combination with a conventional pressure belt, and hence the extended nip press employing the pressure belt of the present invention does not need any rollers for guiding the felt belt. Accordingly, no space for the guide rollers for guiding the felt belt is needed. Thus, the pressure belt of the present invention enables the papermaking machine to be constructed in a simple and compact construction. In the pressure belt, the squeezing layer formed of a porous or cellular material is less resistant to the separation of the fibrous web from the pressure belt, and hence the pressure belt of the present invention facilitates the separation of the fibrous web from the pressure belt, which enables high-speed papermaking operation.

Although the invention has been described in its preferred forms with a certain degree of particularity, it is to be understood that many changes and variations are possible in the invention without departing from the scope and spirit thereof.

What is claimed is:

1. A papermaker's pressure belt for extended nip presses, comprising: a belt base; a squeezing layer formed of a compressible elastic and porous water absorbent material having a large void volume, and formed over the outer side of the belt base; and an impermeable layer impermeable to oil, formed over the inner side of the belt base.

2. A papermaker's pressure belt for extended nip presses, according to claim 1, wherein said belt base is a woven fabric consisting of yarns having high strength, such as synthetic monofilament yarns or synthetic multifilament yarns.

3. A papermaker's pressure belt as recited in claim 1, wherein said squeezing layer is formed of a fibrous batt.

4. A papermaker's pressure belt as recited in claim 1, wherein said squeezing layer comprises a porous sponge material.

5. A papermaker's pressure belt as recited in claim 4, wherein the sponge material is an opened-cell porous material.

6. A papermaker's pressure belt as recited in claim 1, wherein said squeezing layer is formed of a foam resin.

7. A papermaker's pressure belt as recited in claim 1, wherein said impermeable layer comprises a synthetic resin permeating said belt base.

8. A papermaker's pressure belt for extended nip presses comprising: a belt base, a layer of water absorbent porous material having a large void volume formed over the outer side of said belt base, a layer of impermeable material impermeable to oil comprising a synthetic resin formed over the inner side of said belt base, said synthetic resin permeating said belt base and the inner portion of said porous layer, the remainder of said porous layer not penetrated by said synthetic resin comprising a compressible elastic squeezing layer.

* * * * *